(12) United States Patent
Wibaux et al.

(10) Patent No.: US 8,741,977 B2
(45) Date of Patent: Jun. 3, 2014

(54) FOAM COMPOSITIONS AND ARTICLES INCLUDING CYCLODEXTRIN CROSSLINKED WITH POLYURETHANE PREPOLYMER AND PREPARATION THEREOF

(75) Inventors: Anne Marie Paule Wibaux, Antwerpen (BE); Bert Paesen, Diepenbeek (BE)

(73) Assignee: Avery Dennison Corporation, Glendale, CA (US)

( * ) Notice: Subject to any disclaimer, the term of this patent is extended or adjusted under 35 U.S.C. 154(b) by 389 days.

(21) Appl. No.: 12/530,851

(22) PCT Filed: Mar. 11, 2008

(86) PCT No.: PCT/US2008/056554
§ 371 (c)(1),
(2), (4) Date: Sep. 11, 2009

(87) PCT Pub. No.: WO2008/112712
PCT Pub. Date: Sep. 18, 2008

(65) Prior Publication Data
US 2010/0076104 A1 Mar. 25, 2010

Related U.S. Application Data

(60) Provisional application No. 60/894,494, filed on Mar. 13, 2007.

(51) Int. Cl.
*C08G 18/28* (2006.01)

(52) U.S. Cl.
USPC ........ 521/159; 428/423.1; 521/163; 521/170; 521/174; 521/175

(58) Field of Classification Search
USPC ........ 521/163, 170, 174, 175, 159; 428/423.1
See application file for complete search history.

(56) References Cited

U.S. PATENT DOCUMENTS

| | | |
|---|---|---|
| 3,472,835 A | 10/1969 | Buckler et al. |
| 3,861,993 A | 1/1975 | Guthrie |
| 4,917,956 A | 4/1990 | Rohrbach |
| 5,425,881 A | 6/1995 | Szejtli et al. |
| 5,571,529 A * | 11/1996 | Cheong .......................... 424/445 |
| 5,948,829 A | 9/1999 | Wallajapet et al. |
| 2003/0130366 A1* | 7/2003 | Arlt et al. ........................ 521/99 |
| 2004/0209969 A1 | 10/2004 | Arlt et al. |
| 2004/0224622 A1 | 11/2004 | Sakurai et al. |

FOREIGN PATENT DOCUMENTS

| | | |
|---|---|---|
| EP | 0 299 122 | 7/1991 |
| EP | 0 620 455 | 12/2000 |
| EP | 1283218 | * 4/2001 |
| JP | 07-053658 | * 2/1995 |
| WO | 93/04101 | 3/1993 |
| WO | 93/23456 | 11/1993 |
| WO | 02/09782 | 2/2002 |

OTHER PUBLICATIONS

International Search Report and Written Opinion issued in PCT/US2008/56554 dated Jun. 30, 2008.
Amendment to the Claims Under Article 19 submitted in PCT/US2008/056554 dated Aug. 25, 2008.

\* cited by examiner

*Primary Examiner* — John Cooney
(74) *Attorney, Agent, or Firm* — Avery Dennison Corporation (57) ABSTRACT

An odor-absorbing foam composition comprising a cyclodextrin crosslinked with a polyurethane prepolymer. In one embodiment, the foam includes a ratio of the cyclodextrin to the polyurethane prepolymer selected to result in formation of the foam. The odor-absorbing foam may be used in a personal care product or wound care. A process for preparing a foam, including providing a cyclodextrin; providing a polyurethane prepolymer; combining the cyclodextrin with the polyurethane prepolymer; and allowing the polyurethane prepolymer to react with water and crosslink the cyclodextrin to form the foam. A process for preparing an odor-absorbing foam article such as a personal care product, including preparing the foam and applying it or the components thereof to a suitable substrate.

17 Claims, 1 Drawing Sheet

FOAM COMPOSITIONS AND ARTICLES INCLUDING CYCLODEXTRIN CROSSLINKED WITH POLYURETHANE PREPOLYMER AND PREPARATION THEREOF

This application claims the benefit of International Application Number PCT/US2008/056554, which was published in English on Sep. 18, 2008.

TECHNICAL FIELD

The present invention relates to foam compositions including a cyclodextrin crosslinked with a polyurethane prepolymer, and to articles containing such foam compositions, and to methods of preparation thereof. The cyclodextrin may be unmodified or modified.

RELATED ART

Cyclodextrins are cyclic molecules including, most commonly, six, seven or eight alpha-D-(+)-glucopyranose rings bonded together by 1,4 linkages. The common cyclodextrins, having six, seven or eight rings are referred to as alpha- ($\alpha$-), beta- ($\beta$-) and gamma- ($\gamma$-) cyclodextrin, respectively. These cyclodextrins may be conveniently referred to in abbreviated form as $\alpha$-CD, $\beta$-CD and $\gamma$-CD, respectively, and cyclodextrin generally may be referred to as CD. Larger cyclodextrins have been isolated, but are not commonly used. Cyclodextrins are non-reducing alpha-1,4-maltooligosaccharides. Cyclodextrins are formed enzymatically from starch by the action of cyclodextrin glycosyltransferase (EC.3.2.1.19) produced from certain microorganisms.

Cyclodextrins are known to be useful for their ability to reversibly form inclusion complexes, sometimes referred to as clathrates, with many types of compounds. This ability results from the molecular shape, which has been likened to a doughnut or a truncated cone with a cylindrically-shaped cavity formed in the center of the doughnut or truncated cone. The outer surface of cyclodextrin is generally hydrophilic, while the interior cavity is generally hydrophobic. The hydrophilic outer portion allows free cyclodextrins to be water soluble. The hydrophobic interior cavity allows the cyclodextrins to absorb or form inclusion complexes with, e.g., organic compounds of appropriate size. In $\alpha$-CD, the interior cavity has a diameter of about 5 angstroms; the interior cavity of $\beta$-CD has a diameter of about 7 angstroms, and the interior cavity of $\gamma$-CD has a diameter of about 9 angstroms. The interior cavities of all three cyclodextrins have a depth of about 7 angstroms.

A need remains for foams capable of absorbing relatively large quantities of water without losing the foam character. A need remains for foams capable of absorbing water and swelling to two or more times the original volume of the foam. A need remains for foams capable of absorbing water and gaining weight to two or more times the original volume of the foam. A need remains for foams capable of absorbing odors and/or that are capable of holding and delivering agents such as pharmaceuticals, perfumes, and other materials such as antimicrobial agents, skin wellness and health care agents, and are capable of maintaining their foam character when wetted. A need remains for foams exhibiting combinations of these features, as well as for foams exhibiting these and combinations with additional features, such as, for example, foams which have an easily controllable crosslinking reaction as it polymerizes, and the formation of gas bubbles within the structure of the foam, while retaining the capability of absorbing relatively large quantities of water and absorbing odors, without losing the foam character.

SUMMARY

In one embodiment, the present invention relates to foam composition including a cyclodextrin crosslinked with a polyurethane prepolymer and having a foam structure. In one embodiment, the foam is made with a ratio of the water to the cyclodextrin and to the polyurethane prepolymer selected to result in formation of the foam.

In another embodiment, the present invention relates to process including providing a cyclodextrin; providing a polyurethane prepolymer; providing water; and combining the cyclodextrin, the water and the polyurethane prepolymer; and reacting the polyurethane prepolymer with the water and the cyclodextrin to form a foam composition comprising the cyclodextrin crosslinked with the polyurethane prepolymer and having a foam structure.

In another embodiment, the present invention relates to a process for preparing a foam-containing personal care product, including providing a cyclodextrin; providing a polyurethane prepolymer; providing water; and combining the cyclodextrin, the water and the polyurethane prepolymer; reacting the polyurethane prepolymer with the water and the cyclodextrin to form a foam composition comprising the cyclodextrin crosslinked with the polyurethane prepolymer and having a foam structure; and applying the cyclodextrin, the water and the polyurethane prepolymer to a substrate. The substrate may be or include an element of the personal care product. The element may be or include a backing layer on at least a portion of which the foam forms a layer. The personal care product may be one or more of a bandage, a wound dressing, a wipe, a diaper, a diaper pant, a training pant, an absorbent underpant, a protective swimming undergarment, an incontinence garment, a panty shield or liner, a feminine hygiene product or a perspiration shield.

In another embodiment, the present invention relates to a personal care product including a foam composition applied to a substrate, in which the foam composition includes a cyclodextrin crosslinked with a polyurethane prepolymer and having a foam structure, in which a ratio of water to the cyclodextrin and the polyurethane prepolymer has been selected to result in formation of the foam structure when the polyurethane prepolymer is reacted with the water and the cyclodextrin.

In accordance with the invention, the cyclodextrin may be a modified cyclodextrin, an unmodified (natural or native) cyclodextrin or a mixture of any two or more thereof. In accordance with the invention, the cyclodextrin may be or may be derived from (in the case of a modified cyclodextrin) an $\alpha$-cyclodextrin, a $\beta$-cyclodextrin, a $\gamma$-cyclodextrin or a mixture of any two or more thereof.

In one embodiment, the foam composition further includes non-crosslinked cyclodextrin. The non-crosslinked cyclodextrin may include free modified and/or unmodified cyclodextrin, modified and/or unmodified cyclodextrin singly bonded to the polyurethane prepolymer or a mixture of any two or more thereof. "Free" cyclodextrin, modified or unmodified, is not chemically bonded to the polyurethane-cyclodextrin structure.

In one embodiment, a portion of the cyclodextrin and/or modified cyclodextrin is complexed. The cyclodextrin may be complexed, e.g., with an antimicrobial agent or other moieties described in more detail below.

In accordance with one embodiment, the cyclodextrin provides improved odor absorption due to the odor absorbing characteristics of the cyclodextrin. In addition, the cyclodextrin may stiffen and/or provide a stabilizing effect to the foam by virtue of its having been crosslinked into the foam structure. By controlling the relative amounts of cyclodextrin, water and polyurethane prepolymer and, in some embodiments, other ingredients such as polyether and/or polyester polyols, the exact physical characteristics of the foam, e.g., its stiffness, rigidity and/or flexibility, can be controlled and adjusted. The quantity of water in the reaction mixture relative to the cyclodextrin and the polyurethane prepolymer is controlled to obtain a foam rather than a hydrogel. In one embodiment, the quantity of water relative to the cyclodextrin and the polyurethane prepolymer in the reaction mixture is controlled to avoid formation of a hydrogel.

As used herein, the term "cyclodextrin" refers collectively and generally to any of the cyclodextrins disclosed herein, whether modified or unmodified, complexed or not complexed, except where specific cyclodextrins are referred to by a more specific identification.

The present invention, in its various embodiments, thus addresses the needs described above. That is, in one embodiment, the foam is capable of absorbing relatively large quantities of water, i.e., at least about 20% of the original foam weight. In another embodiment, the foam is capable of absorbing water and increasing its weight by 20% to about 3000% of its original weight. In another embodiment, the foam is capable of absorbing water and increasing its weight by 100% to about 2000% of its original weight. In another embodiment, the foam is capable of absorbing water and increasing its weight by 200% to about 1600% of its original weight. In another embodiment, the foam is capable of absorbing odors and/or delivering various agents such as pharmaceuticals, perfumes, antimicrobial agents, skin wellness and health care agents and other materials which may be complexed with the cyclodextrin in the foam or may be otherwise incorporated into the foam. In another embodiment, the foam exhibits various combinations of these features.

In other embodiments, the present invention provides an easily controllable crosslinking and foam forming reaction as the cyclodextrin, water and polyurethane prepolymer polymerize, including the formation of gas bubbles within the structure of the foam. The foam product includes the capabilities of absorbing relatively large quantities of water and of absorbing odors. In other embodiments, the foam exhibits various combinations of the foregoing features and additional features, such as for example, including delivery of medicaments, including perfumes or other materials carried in the foam or complexed with the cyclodextrin. Thus the foam can be used to deliver the medicaments or absorb odors or provide a pleasing odor to help mask any odors emanating from the wound being treated.

DETAILED DESCRIPTION

"Foam" refers to a two-phase gas-solid system that has a supporting solid lattice of cell walls which are continuous throughout the structure. The gas (typically air or carbon dioxide) phase in a foam is usually distributed in void pockets called cells. The supporting solid may be relatively rigid or flexible.

"Open-cell foams" are polymeric materials having substantial void space in the form of cells defined by a plurality of mutually connected, three dimensionally branched webs of polymeric material, wherein the cells typically have openings to permit fluid communication from one cell to another. That is, the individual cells of the foam are generally not completely discrete from each other. The cells in open-cell foams have intercellular openings, or "windows" which are large enough to permit fluid transfer from one cell to another within the foam structure.

In one embodiment, the present invention relates to a foam composition comprising a modified cyclodextrin crosslinked with a polyurethane prepolymer and water. In one embodiment, a ratio of the modified cyclodextrin to the water and to the polyurethane prepolymer is selected to result in formation of the foam. That is, while it is possible to combine a cyclodextrin with water and a polyurethane prepolymer in a wide range of ratios, in the present invention, the ratio is selected, and the reaction conditions are selected, such that a foam, as defined herein, is formed from the crosslinking reaction between the modified cyclodextrin, the water and the polyurethane prepolymer.

In accordance with embodiments of the present invention, polyurethane foams are prepared by reacting organic polyfunctional isocyanates (polyurethane prepolymers) with cyclodextrins and optionally other organic polyols. For crosslinking, the cyclodextrins or polyols have two or more isocyanate-reactive hydrogen atoms. When this reaction is conducted under anhydrous conditions and in the absence of gas forming reagents the resulting polyurethane is substantially non-porous. If a cellular or foam product is desired, a blowing agent, which may contain, for example, water and an excess of the of the polyfunctional isocyanate, is present in the initial reactant mixture. As is known in the art, the reaction of the water with the isocyanate compound produces carbon dioxide, which is temporally entrapped in the reaction mixture as it solidifies and forms a network of interconnecting open cells. The density of the resultant foam is dependent on the amount of excess isocyanate and water employed. The foam composition can be made relatively flexible or rigid depending upon the degree of crosslinking that takes place within the molecules, during the reaction to produce the foam, as well as on the specific cyclodextrins and/or other polyols that are present. The degree of crosslinking within a foam is determined by the number of active hydroxyl groups (e.g., 2-6 usually, as known, however more are possible in cyclodextrin) within the polyol structure.

Foam compositions are made when a disperse phase is combined with water to produce gas bubbles as it polymerizes, resulting in a solid material with multiple pores of either trapped gas or open cells throughout the structure. This reaction can proceed to result in a foam that is primarily a reticulated open-celled structure or a closed cell structure, or a combination of both. A foam composition is flexible or rigid depending upon the degree of crosslinking that takes place within the molecules, during the reaction to produce a foam. The degree of crosslinking within a foam is determined by the number of active hydroxyl groups (e.g., 2-6 or more) within the structure. For example, if unmodified cyclodextrin is used and no water is added, a quite rigid polyurethane with little or no foam character would be expected, whereas using a cyclodextrin, optionally adding an additional polyol (such as a polyether polyol) and water, should result in the formation of a foam that may be relatively flexible, particularly where the reaction is carried out at an elevated temperature and including an polyether polyol. It is noted that β-cyclodextrin, for example, having 3 hydroxyl groups on each of 7 glucopyranose rings, has a total of 21 potentially cross-linkable sites. While it is unlikely in which all 21 had been reacted could be obtained, it is clearly possible for a cyclodextrin to be highly crosslinked and, by the same token, it is possible for a cyclodextrin to be highly modified.

A foam, as used herein, is a polymeric material which exhibits the ability to swell in water or to absorb at least 20% of its weight of water to which it is exposed and to retain at least a portion of the water within its structure without losing its foam character and structural integrity.

Addition of the "non-cyclodextrin" polyol, e.g., a polyether polyol, to the polyurethane prepolymer polymerization/crosslinking reaction results in the formation of soft rubbery polyurethane segments together with the more rigid polyurethane segments produced by the cyclodextrin reaction with the polyurethane prepolymer. Such flexible foams that may be particularly useful in wound treatment, drug delivery and other medical applications.

In one embodiment, the foam structure is an open cell foam. In another embodiment, the foam structure is a closed cell foam. In another embodiment, the foam structure is a microcellular foam. In another embodiment, the foam structure is a combination of two or more of these foam structures.

Non-Modified and Modified Cyclodextrins

As discussed above, the most common cyclodextrins are alpha- ($\alpha$-), beta- ($\beta$-) and gamma- ($\gamma$-) cyclodextrin, having 6, 7 or 8 glucopyranose rings in each cyclodextrin molecule, respectively. Native or natural, i.e., unmodified, cyclodextrin includes three hydroxyl groups on each glucopyranose ring. Each of the hydroxyl groups is an isocyanate-reactive group. In one embodiment, such unmodified or native cyclodextrins may be used to prepare the foam composition of the present invention.

In another embodiment, since the isocyanate reactivity of the cyclodextrin hydroxyl groups is restricted or reduced to some degree (due to steric effects of the remainder of the cyclodextrin molecule compared to hydroxyl groups in molecules in which the hydroxyl group is more easily accessible) it is helpful to prepare modified cyclodextrins by addition of groups providing better steric access to active hydrogens for reaction with the reactive isocyanate groups. Thus, to increase the reactivity of the cyclodextrin to the reactive isocyanate groups of the polyurethane prepolymer, it has been found useful to modify the cyclodextrin by functionalization with groups such as 2-hydroxy propyl, which can be introduced to the cyclodextrin by known reactions or can be obtained commercially.

In one embodiment, the modified cyclodextrin is modified by being bonded to a moiety comprising at least one isocyanate-reactive group. In many isocyanate-reactive groups, the reactivity results from the presence of an active hydrogen. Examples of suitable moieties comprising isocyanate-reactive groups include a hydroxyalkyl group, an aminoalkyl group, a carboxyl group, a sulfhydryl group, an epoxy group, or a combination of any two or more thereof. Of these, all but the epoxy include an active hydrogen, and the epoxy is sufficiently reactive to react with an isocyanate group. In one embodiment, the term "active hydrogen" refers to a moiety containing a hydrogen atom which, because of its position in the molecule, displays significant activity according to the Zerewitnoff test, described by Wohler in JACS, Vol. 49, p. 3181 (1927). Illustrative active hydrogen moieties include —COON, —OH, —NH$_2$, NH—, CONH$_2$, —CONH— and —SH. The modifying group may be introduced by known methods, such as by use of an epoxy or other group capable of reaction with one of the primary or secondary hydroxyl groups on the unmodified cyclodextrin.

As described above, cyclodextrins include six, seven or eight, and possibly more, glucopyranose rings. Each glucopyranose ring includes three hydroxyl groups, two secondary hydroxyl groups attached to carbon atoms on the ring itself and one primary hydroxyl group attached to the methylene carbon attached to the ring. A schematic diagram or drawing of a $\beta$-cyclodextrin molecule is shown in FIG. 1, in which the hydroxyl groups are shown as —OR groups.

Figure 1:
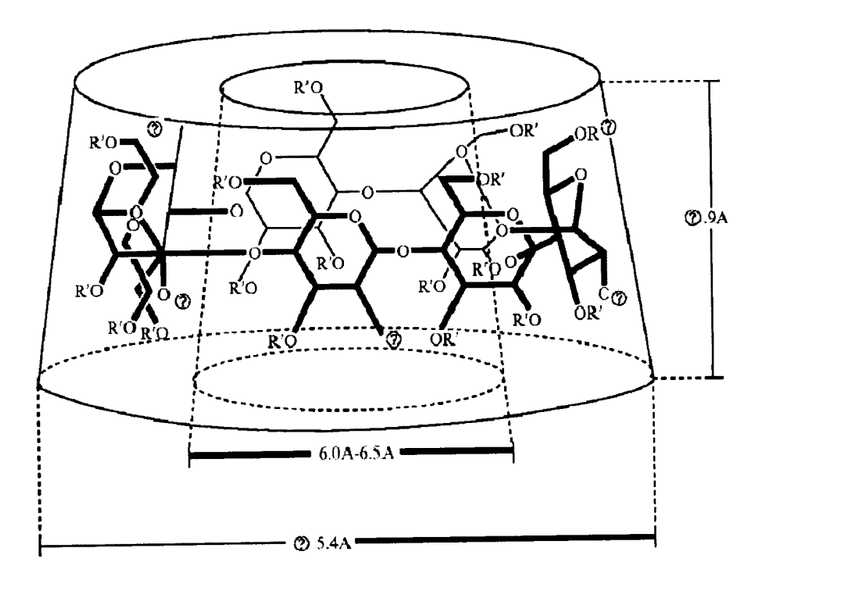

In FIG. 1, the hydroxyl groups on the lower side are the secondary hydroxyls, and the hydroxyl groups on the upper side are the primary hydroxyls. As noted above, there are three hydroxyl groups on each glucopyranose ring, each of which is capable of reacting with an appropriate group to form either a crosslinking bond or a derivatizing or modifying bond. Each of the three hydroxyl groups on each of the glucopyranose rings of the cyclodextrin exhibits slightly different reactivity. As suggested by FIG. 1, the hydroxyl groups are accessible but may be somewhat sterically hindered, thus exhibiting lower reactivity than would hydroxyl groups on, e.g., a single glucopyranose ring.

In order to enhance the availability of reactive sites, and thus to increase the isocyanate reactivity of the cyclodextrin as a whole, the cyclodextrin may be modified or derivatized. In this regard, it is noted that FIG. 1, rather than —OH groups, —OR groups are shown, suggesting that R may be other than hydrogen. Thus, in the cyclodextrin shown in FIG. 1, the R groups can be hydrogen or any one of a number of substituents, such as hydroxypropyl, amino, amido, and carboxyl, just to name a few. Cyclodextrin may be modified with a wide variety of groups. In many such embodiments, the derivative is formed through a bond to the oxygen atom of one or more of the three available hydroxyl groups on the glucopyranose rings of the cyclodextrin. In one embodiment, the substituent includes the reactive moiety, i.e., the —OH, —SH, —NH$_2$, or other group, on the terminal carbon atom, that is on the carbon atom most distant from the cyclodextrin molecule. However, the reactive moiety may be on any carbon atom in the modifying group.

In one embodiment, the modified cyclodextrin of the present invention is modified by derivitization by a hydroxyalkyl group (—ROH), an aminoalkyl group (—RNH$_2$ or —RNHR'), an alkyl-carboxyl group (—RCOOH), an alkyl-sulfhydryl group (—RSH), an epoxy group, or a combination of any two or more thereof.

In one embodiment, the modified cyclodextrin includes a $C_1$-$C_6$ mono-, di- or higher hydroxyalkyl group, such as a hydroxymethyl, hydroxyethyl, 2- or 3-hydroxy-n-propyl, 2- or 3-hydroxyisopropyl, alcohols of higher alkyl groups ($C_7$ or higher, up to at least $C_{12}$), and diols, triols and higher polyols of such alkyl groups. The hydroxyl group(s) may be on any carbon atom of the alkyl group. In one embodiment, in the above noted —ROH, R may range from $C_1$ to about $C_6$, and in another embodiment, R may range from $C_1$ up to at least $C_{12}$. In one embodiment, the modified cyclodextrin is 2-hydroxypropyl cyclodextrin, and in one embodiment, the modified cyclodextrin is 2-hydroxypropyl $\beta$-cyclodextrin, a particularly well known and well-studied modified cyclodextrin. In another embodiment, the modified cyclodextrin is 3-hydroxypropyl cyclodextrin. In the 3-hydroxypropyl cyclodextrin, the hydroxyl group should be more sterically accessible for reaction by, e.g., the reactive isocyanate of a polyurethane prepolymer.

In one embodiment, the modified cyclodextrin includes an alkyl-thiol or alkyl-sulfhydryl group, that is an alkyl group containing an —SH substituent. The hydrogen on the —SH group is an active hydrogen. Suitable alkylthiols are any corresponding to the above-identified mono- or poly-hydroxyalkyl groups. The thiol group(s) may be on any carbon atom of the alkyl group. In one embodiment, in the above noted —RSH, R may range from $C_1$ to about $C_6$, and in another embodiment, R may range from $C_1$ up to at least $C_{12}$.

In one embodiment, the modified cyclodextrin includes an aminoalkyl group, that is, an alkyl group containing an amine moiety. In one embodiment, the amine moiety is either a primary or secondary amine, both of which have an active hydrogen. Suitable aminoalkyl groups include, for example, alkyl groups having one or more primary or secondary amine groups, and from 1 to about 12 carbon atoms, in one embodiment from 1 to about 8 carbon atoms, and in another embodiment from 1 to about 6 carbon atoms, and in still another embodiment, 1, 2 or 3 carbon atoms. The amino group(s) may be on any carbon atom of the alkyl group. In one embodiment, in the above noted —$RNH_2$ or —RNHR', R and R' independently may range from $C_1$ to about $C_6$, and in another embodiment, R may range from $C_1$ up to at least $C_{12}$. In addition, as noted above, in one embodiment, the modified cyclodextrin may include an amide, either primary or secondary, corresponding to any of the foregoing amines and the following carboxylic acids. In one embodiment, the reaction of an amine with a given polyurethane prepolymer is much faster than the reaction of a hydroxyl group with the given polyurethane prepolymer.

In one embodiment, the modified cyclodextrin includes a carboxyl group, i.e., a —RCOOH group, where R may be a bond to the oxygen atom of the cyclodextrin, or a $C_1$ to about a $C_{12}$ alkyl group. Thus, for example, the cyclodextrin may be substituted with a formyl, acetyl, propionyl, or higher alkyl-carboxyl group. The carboxyl group(s) may be on any carbon atom of the alkyl group. In one embodiment, in the above noted —RCOOH, R may range from $C_1$ to about $C_6$, and in another embodiment, R may range from $C_1$ up to at least $C_{12}$.

In one embodiment, the modified cyclodextrin includes an epoxy group, i.e., a group having a general formula:

where R may be a bond to the oxygen atom of the cyclodextrin, or a $C_1$ to about a $C_{12}$ alkyl group. The epoxy group(s) may be on any carbon atom of the alkyl group.

In one embodiment, in any of the above substituted cyclodextrins, R may be a cycloalkyl group, an aryl group, an alkylaryl group, an arylalkyl group, an ether-containing group, or other known group capable of attachment to the cyclodextrin molecule via one of the hydroxyl groups, alternative to the alkyl groups described above, and containing at least one isocyanate-reactive group in the R group. In one embodiment, any of these "linking" groups may be used, with the proviso that the cyclodextrin is substituted with a group including a reactive moiety, such as the active hydrogen mentioned above, that functions to increase the ability of the cyclodextrin molecule to be crosslinked in forming the foam of the present invention.

Suitable methods are known in the art for forming the foregoing modified cyclodextrins. Suitable methods for preparation of a wide variety of suitably modified cyclodextrins are disclosed in Croft et al., "Synthesis of Chemically Modified Cyclodextrins", *Tetrahedron*, Vol. 39, No. 9, pp. 1417-1474, 1983, in. In addition, modified cyclodextrins are commercially available commercially, for example, from CyDex, Inc., Lenexa, Kans., from CycloLab Ltd., Budapest, Hungary, and from Cyclodextrin Technologies Development, Inc., High Springs, Fla.

In one embodiment, the content of the cyclodextrin in the composition is in the range from about 0.5 wt % to about 50 wt %, and in another embodiment, the content of the cyclodextrin in the composition is in the range from about 1 wt % to about 40 wt %, and in another embodiment, the content of the cyclodextrin in the composition is in the range from about 3 wt % to about 20 wt %, and in another embodiment, the content of the cyclodextrin in the composition is in the range from about 5 wt % to about 10 wt %. The foregoing weight percentages are based on the total weight of the composition, prior to the crosslinking, foaming and drying steps.

Here and throughout the specification and claims, the numerical limits of the ranges and ratios may be combined. Thus, for example, in the foregoing, although a range of about 1 wt % to about 10 wt % is not specifically recited, it is deemed to be within the scope of the disclosure. In addition, all integral values within the foregoing ranges are deemed to be disclosed, even if not specifically mentioned or exemplified.

Polyurethane Prepolymer

In one embodiment, the polyurethane prepolymer comprises a reactive isocyanate moiety. In one embodiment, the reactive isocyanate moiety comprises an aliphatic, cycloaliphatic, arylaliphatic, heterocyclic or aromatic polyisocyanate or a mixture thereof.

In one embodiment, the polyurethane prepolymer has an average isocyanate functionality of about 2 or greater. In another embodiment, the polyurethane prepolymer has an average isocyanate functionality of about 2.2 or greater, and in another embodiment, the polyurethane prepolymer has an average isocyanate functionality of about 2.5 or greater, and in yet another embodiment, the polyurethane prepolymer has an average isocyanate functionality of about 3 or greater, while in still another embodiment, the polyurethane prepolymer has an average isocyanate functionality of about 4 or greater.

Examples of such polyisocyanates include ethylene diisocyanate, 1,4-tetramethylene diisocyanate, 1,6-hexamethylene diisocyanate, 1,12-dodecane diisocyanate, cyclohexane-1,3- and 1,4-diisocyanate and mixtures of these isomers; 2,4- and 2,6-toluene diisocyanate and mixtures of these isomers, 1,3- and/or 1,4-phenylene diisocyanate, 2,5'- and/or 4,4'-diphenyl methane diisocyanate, and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates and similar known polyisocyanates. In one embodiment, the polyisocyanate used as the polyurethane prepolymer is one of the toluene diisocyanates.

In one embodiment, the polyurethane prepolymer comprises a polyisocyanate such as toluene-2,4-diisocyanate, toluene-2,6-diisocyanate, a mixture of toluene 2,4-diisocyanate and toluene-2,6-diisocyanate, m-phenyl-diisocyanate, 3,3'-diphenyl-4,4'-biphenylene diisocyanate; 4,4'-biphenylene diisocyanate; 4,4'-diphenylmethane diisocyanate; 3,3'-dichloro-4,4'-biphenylene diisocyanate; cumene-2,4-diisocyanate; 1,5-napthalene diisocyanate; p-phenylene diisocyanate; 4-methoxy-1,3-phenylene diisocyanate; 4-chloro-1,3-phenylene diisocyanate; 4-bromo-1,3-phenylene diisocyanate; 4-ethoxy-1,3-phenylene diisocyanate; 2,4-dimethyl-1,3-phenylene diisocyanate; 5,6-dimethyl-1,3-phenylene diisocyanate; 2,4-diisocyanatodiphenylether; 4,4'-diisocyanatodiphenylether benzidine diisocyanate; 4,6-dimethyl-1,3-phenylene diisocyanate; 9,10-anthracene diisocyanate; 4,4'-diisocyanatodibenzyl; 3,3'-dimethyl-4,4'-diisocyanatodiphenylmethane; 2,6-dimethyl-4,4'-diisocyanatodiphenyl; 2,4-diisocyanatostilbene; 3,3'-dimethoxy-4,4'-diisocyanatodiphenyl; 1,4-anthracene diisocyanate; 2,5-fluorene diisocyanate; 1,8-naphthalene diisocyanate; 2,6-diisocyanatobenzfuran; 2,4,6-toluene triisocyanate; p,p',p"- triphenylmethane triisocyanate; polymeric 4,4'-diphenylmethane diisocyanate; isophorone diisocyanate, hexamethylene diisocyanate, trans-1-4 cyclohexyl diisocyanate, 2,4- and 2,6-hexahydrotoluene diisocyanate, 4,4'-, 2,2'-, or 2,4'-dicyclohexylmethane diisocyanate, or 1,3,5- tricyanatocyclohexane, or mixtures or combinations of any two or more of the foregoing. In one embodiment, the polyisocyanate is isophorone diisocyanate.

In one embodiment, the polyurethane prepolymer may be a partially polymerized polyurethane polymer having unreacted isocyanate groups suitable for crosslinking the modified cyclodextrins. Thus, for example, in one embodiment, the polyurethane prepolymer may be a reaction product of a polyether polyol with an excess of polyisocyanate, in which a polyurethane has been formed, but in which reactive isocyanate groups remain as end groups on the polymer chains. In one embodiment, the polyether polyol is a lower alkyl polyether polyol, for example, a methyl, ethyl, propyl or butyl polyether polyol, or mixtures and combinations of two or more thereof. The alkyl groups may be branched or un-branched.

The polyurethane prepolymer may be a capped product of the reaction of an excess of a suitable diisocyanate with a polyoxyalkylene polyol, in which there are substantially no free hydroxyl groups, and most or all of the polymer chains are terminated or capped with reactive isocyanate groups, and each polymer molecule has an isocyanate functionality of at least two. This capped product, if reacted with water, can be used to form a conventional polyurethane foam. The polyoxyalkylene polyol, in one embodiment, has a molecular weight of about 200 to about 20,000, and in one embodiment, has a molecular weight from about 600 to about 6,000, with a hydroxyl functionality per polymer molecule of at least 2, and in one embodiment, a hydroxyl functionality per polymer molecule from 2 to about 6. Suitable polyalkylene polyols include, for example, polyethylene oxide and the copolymer of ethylene oxide and propylene oxide. Additional information relating to formation of such partially polymerized polyurethane prepolymers, exemplary reactants and suitable reaction conditions may be found, for example, in U.S. Pat. No. 3,861,993, the disclosure of which relating to formation of partially polymerized polyurethane prepolymer, the reactants and reaction conditions, is incorporated by reference herein.

In one embodiment, the partially polymerized polyurethane prepolymer has a weight average molecular weight in the range from about 500 to about 30,000 or higher. In one embodiment, the partially polymerized polyurethane prepolymer has a weight average molecular weight in the range from about 500 to about 10,000. In one embodiment, the partially polymerized polyurethane prepolymer has a weight average molecular weight in the range from about 1000 to about 5,000. In one embodiment, on average, each molecule of the partially polymerized polyurethane prepolymer has an isocyanate functionality of about two or greater. In one embodiment, on average, each molecule of the partially polymerized polyurethane prepolymer has a weight average molecular weight in the range from about 500 to about 10,000, and has an isocyanate functionality of about 2 or greater.

Suitable polyurethane prepolymers are commercially available, for example, from The Dow Chemical Co., Midland, Mich., under the trademark HYPOL®, and from Cytec Industries Inc. under the trademark CONATHANE®, and from Air Products and Chemicals, Inc., Allentown, Pa. under the trademarks AIRTHANE® and VERSATHANE®.

In one embodiment, the content of the polyurethane prepolymer in the composition is in the range from about 15 wt % to about 95 wt %, and in another embodiment, the content of the polyurethane prepolymer in the composition is in the range from about 25 wt % to about 90 wt %, and in another embodiment, the content of the polyurethane prepolymer in the composition is in the range from about 35 wt % to about 70 wt %, and in another embodiment, the content of the polyurethane prepolymer in the composition is in the range from about 40 wt % to about 60 wt %. The foregoing weight percentages are based on the total weight of the composition, prior to the crosslinking, foaming and drying steps.

Water

The water used in forming the foam composition of the present invention should be deionized or distilled water, although tap water may be suitable in some instances. In one embodiment, the content of the water in the composition is in the range from about 10 wt % to about 80 wt %, and in another embodiment, the content of the water in the composition is in the range from about 20 wt % to about 60 wt %, and in another embodiment, the content of the water in the composition is in the range from about 30 wt % to about 50 wt %. The foregoing weight percentages are based on the total weight of the composition, prior to the crosslinking, foaming and drying steps.

Crosslinking Cyclodextrin with Polyurethane Prepolymers

In one embodiment, the present invention relates to a foam composition including a cyclodextrin crosslinked with a polyurethane prepolymer and having a foam structure. The cyclodextrin may be a modified cyclodextrin, an unmodified cyclodextrin or a mixture thereof. The cyclodextrin may be or may be derived from an α-cyclodextrin, a β-cyclodextrin, a γ-cyclodextrin or a mixture of any two or more thereof. The modified cyclodextrin may be a cyclodextrin modified by being bonded to a moiety comprising at least one isocyanate-reactive group. The at least one isocyanate-reactive group may include a hydroxyalkyl group, an aminoalkyl group, a carboxyl group, a sulfhydryl group, an epoxy group, or a combination of any two or more thereof.

In one embodiment, the foam composition includes a cyclodextrin crosslinked with polyurethane prepolymer and water which comprises a reaction product of a reactive isocyanate moiety reacted with at least one isocyanate-reactive group on the cyclodextrin. In one embodiment, when the cyclodextrin is crosslinked by a polyurethane prepolymer, a reactive isocyanate moiety on the polyurethane prepolymer reacts with at least one isocyanate-reactive group on the cyclodextrin. In one embodiment, at least two isocyanate-reactive groups on the cyclodextrin react with reactive isocyanate moieties. At least one isocyanate-reactive group may be a primary hydroxyl group of the cyclodextrin, a secondary hydroxyl group of the cyclodextrin, an active hydrogen or another reactive group on a modifying group attached to the cyclodextrin, or a combination of any two or more thereof. In one embodiment, at least a portion of the isocyanate-reactive group is the active hydrogen on a modifying group attached to the cyclodextrin. In general, the cyclodextrin may be modified in order to improve the availability of the isocyanate-reactive group for reaction with a reactive isocyanate moiety on the polyurethane prepolymer.

As will be recognized, as a result of the crosslinking reaction, it is possible that some of the cyclodextrin may not be crosslinked. That is, some portion of the cyclodextrin may be completely unreacted or may be singly reacted with the polyurethane prepolymer.

In one embodiment, the foam composition further includes unmodified or natural cyclodextrin as a component of the cyclodextrin in the reaction. In one embodiment, the foam composition may further include non-crosslinked modified and/or non-crosslinked unmodified cyclodextrin. In one embodiment, the non-crosslinked modified cyclodextrin may include free modified and/or unmodified cyclodextrin, modified and/or unmodified cyclodextrin singly bonded to the polyurethane prepolymer or a mixture of any two or more thereof. Thus, modified cyclodextrin and/or unmodified cyclodextrin may be added to the foam after the crosslinking, or may remain unreacted after the crosslinking. In one embodiment, the amount of unreacted modified cyclodextrin is determined by the ratio of the quantity of polyurethane prepolymer, and the quantity of water, e.g., the reactive polyisocyanate, to the quantity of active-hydrogen or isocyanate-reactive moieties present in the crosslinking reaction mixture. Additional details on further ingredients alternatively present in the crosslinking reaction mixture are provided below.

In one embodiment, the foam composition includes unmodified cyclodextrin crosslinked with the polyurethane prepolymer and water. In one embodiment, unmodified cyclodextrin may be added to the crosslinking reaction mixture, together with the modified cyclodextrin in the reaction mixture.

In the reaction, the hydroxyl groups of the cyclodextrin (both natural and modified) and the water will compete to react with the available isocyanate. As a result, at least a portion of the cyclodextrin becomes crosslinked with the polyurethane prepolymer and some foaming results from the reaction of the water with some of the isocyanate groups. As noted, some of the cyclodextrin may be singly bonded or may be not bonded at all to the polyurethane prepolymer, in which case the cyclodextrin is not crosslinked, but is nevertheless part of the foam composition in accordance with the present invention.

Although not to be bound by theory, it appears that the hydroxyl groups on the "body" of cyclodextrin itself have a reactivity towards the isocyanate groups of the polyurethane prepolymer that is similar to the reactivity of water towards the isocyanate groups. It further appears that the hydroxyl groups on cyclodextrin modifying substituents, such as in 2- or 3-hydroxypropyl-cyclodextrin, are more reactive toward the isocyanate groups of the polyurethane prepolymer. Thus, it appears that modified cyclodextrin is more readily reacted with the isocyanate groups and therefore is more readily incorporated into the nascent foam composition than is natural or unmodified cyclodextrin. These facts can be taken into consideration when designing a particular foam composition in accordance with the present invention. Thus, for example, if a higher loading of crosslinked cyclodextrin is desired, either less water relative to the amount of cyclodextrin and polyurethane prepolymer) can be used, more modified cyclodextrin can be used, or a combination of these.

In one embodiment, the foam composition of the present invention is capable of swelling upon absorption of water by increasing its volume by at least 20% greater than original. In another embodiment, the foam composition of the present invention is capable of swelling upon absorption of water by increasing its volume by at least about 100% greater than original. In another embodiment, the foam composition of the present invention is capable of swelling upon absorption of water by increasing its volume by at least about 200% greater than original. In another embodiment, the foam composition of the present invention is capable of swelling upon absorption of water by increasing its volume to about 300% greater than original. For example, in one embodiment, a foam having an initial size, defined as zero percent swelling, upon exposure to moisture for a period of 18 hours, exhibits a volume of 195% of its original volume, i.e., a swelling to about twice its original volume.

Similarly, in one embodiment, the foam composition of the present invention is capable of increasing its own weight upon absorption of water, that is, by increasing its initial weight to at least about 20% greater than its original weight. In another embodiment, the foam composition of the present invention is capable of increasing its own weight upon absorption of water by increasing its initial weight to about 100% greater than its original weight. In another embodiment, the foam composition of the present invention is capable of increasing its own weight upon absorption of water by increasing its initial weight to about 200% greater than its original weight. In another embodiment, the foam composition of the present invention is capable of increasing its own weight upon absorption of water by increasing its initial weight to about 300% greater than its original weight. For example, in one embodiment, a foam having an initial weight of about 2.0 grams, upon exposure to moisture for a period of 18 hours, exhibits a weight increase to about 6.5 grams, i.e., a weight increase of about 350% greater than it original weight. In other embodiments, the weight increase may be in the range from about 300% to about 1800%,; and in another embodiment, up to about 1600% to about 1700%. This water absorption/weight increase capability is not expected and quite surprising, since known foams, while capable of some water absorption and weight increase, are not believed to be capable of a weight increase to such a degree.

Additional Components

In one embodiment, in preparing the foam composition, the ingredients combined for the crosslinking further include an alkylene glycol, a polyalkylene glycol, glycerol or a combination of any two or more thereof. In one embodiment, the addition of these materials provides an elongating, plasticizing effect and greater flexibility to the foam. Thus, in one embodiment, a portion of the alkylene glycol, the polyalkylene glycol, the glycerol or a combination of any two or more thereof is chemically bonded to the polyurethane prepolymer. The alkylene glycol, polyalkylene glycol, glycerol or combination of any two or more thereof may be present in the composition up to about 20 wt % of the composition. The foregoing weight percentages are based on the total weight of the composition, prior to the crosslinking, foaming and drying steps.

As will be understood, addition of such hydroxyl-containing additives can result in the addition of these into the foam structure, by any one or more of crosslinking, single bonding or simply being incorporated physically into the foam structure, since the hydroxyl groups will be reactive similar to the hydroxyl groups in the cyclodextrin and the water. These same glycols can be used to form the partially polymerized polyurethane prepolymer.

In one embodiment, at least a portion of the modified cyclodextrin is complexed with a suitably selected molecule. As is well known in the art, cyclodextrins are capable of complexing a wide variety of organic molecules, including pharmaceuticals, perfumes, fragrances, etc., e.g., by partially or completely holding molecules of the complexed material within the cyclodextrin cavity. Thus, the foam composition of the present invention may be used in delivery of any suitable such material. The content of the cyclodextrin-complexed material in the foam composition depends upon the cyclodextrin content. In one embodiment, the content of the cyclodextrin-complexed material in the foam composition may range from about 0.01 wt % to about 30 wt %, and in another embodiment, the content of the cyclodextrin-complexed material in the foam composition may range from about 0.1 wt % to about 10 wt %, and in yet another embodiment, the content of the cyclodextrin-complexed material in the foam composition may range from about 0.5 wt % to about 5 wt %.

In one embodiment, the foregoing foam may be used in an article such as a personal care product. Exemplary personal care products include, without limitation, one or more of a bandage, a wound dressing, a wipe, a diaper, a diaper pant, a training pant, an absorbent underpant, a protective swimming undergarment, an incontinence garment, a panty shield or liner, a feminine hygiene product or a perspiration shield. Other suitable articles and personal care products also may include the foam composition of the present invention.

Process for Preparing the Foam

In one embodiment, the present invention relates to a process for preparing a foam, in which the process includes:
  providing a cyclodextrin;
  providing a polyurethane prepolymer;
  providing water;
  combining the cyclodextrin, the water and the polyurethane prepolymer; and
  reacting the polyurethane prepolymer with the water and the cyclodextrin to form a foam composition comprising the cyclodextrin crosslinked with the polyurethane prepolymer and having a foam structure. In one embodiment, as noted above, quantities of the modified cyclodextrin, the water and the polyurethane prepolymer are selected to result in formation of the foam. That is, the ratio of the ingredients is selected to produce a desired foam that is stable, swellable and exhibits the desired properties as described further herein. In addition, the quantity of water is controlled to avoid the formation of a hydrogel as opposed to the foam.

The reaction may be carried out at a temperature from about 20° C. to about 120° C., in one embodiment, from about 35° C. to about 90° C., and in one embodiment, at about 50° C., for a suitable period of time. A suitable period of time may range from about 1 minute to about 18 hours, in one embodiment, from about 10 minutes to about 8 hours, and in another embodiment, from about 15 minutes to about 2 hours. As will be recognized, the greater the temperature, the faster the reaction, and likely, the greater the volume of the foam produced. The temperature may be adjusted in accordance with the type of substrate on which the foam is formed, in such embodiment.

In one exemplary embodiment, the ingredients are mixed at room temperature, allowed to react, in which both the crosslinking reaction of polyurethane prepolymer isocyanate with cyclodextrin hydroxyl groups and optionally with other active hydrogen-containing moieties and the foam forming reaction of polyurethane prepolymer isocyanate with water take place, for about 5 minutes, and then resulting foam composition is placed in an oven at a temperature of about 50° C. to dry for a period of about 2 hours. In another embodiment, the ingredients are mixed at room temperature, allowed to react for about 15 minutes, and the foam composition is then placed in an oven at a temperature of about 100° C. to dry for a period of about 1 hour.

In one embodiment, the modified cyclodextrin used in this method may be any of the cyclodextrins disclosed above. In one embodiment, the cyclodextrin is a modified cyclodextrin and in another embodiment the cyclodextrin is an unmodified cyclodextrin and in yet another embodiment, the cyclodextrin is a mixture of any two or more cyclodextrins. That is, the mixture may be of any two or more unmodified cyclodextrins, any two or more modified cyclodextrins, or any two or more unmodified and modified cyclodextrins. The polyurethane prepolymer used in this method may be any of the polyurethane prepolymers disclosed above.

In one embodiment, the step of combining the modified cyclodextrin with the polyurethane prepolymer may be carried out at room temperature. In another embodiment, the step of combining may be carried out at an elevated temperature, in order to accelerate the reaction and to enhance the foam formation. As will be recognized, when the crosslinking reaction between the cyclodextrin, water and polyurethane prepolymer is carried out at an elevated temperature, carbon dioxide released during the reaction will cause formation of the foam and thereby the foam composition will be formed. In one embodiment, the water included in the reaction mixture is adjusted to provide a controlled foam formation. The water reacts with the isocyanate group of the polyurethane prepolymer, forming an unstable carbamic acid which reacts with a further isocyanate group and releases carbon dioxide.

In one embodiment, other foaming agents known in the polyurethane arts may be used for increasing the volume of the foam composition. Thus, foaming agents such as fluorocarbons or low molecular weight hydrocarbons may be added to adjust the amount of foaming.

In carrying out the combination and allowing the polyurethane prepolymer to react with and crosslink the modified cyclodextrin to form the foam, the reactive isocyanate groups preferentially react with the more easily accessible isocyanate-reactive moieties. Thus, for example, as noted above, the hydroxyl group on the hydroxypropyl group of a cyclodextrin modified by 2- or 3-hydroxypropyl should be more accessible and thereby more reactive than would be the hydroxyl groups on the cyclodextrin molecule itself. Similarly, it would be expected that the primary hydroxyl group on the 6-position of the cyclodextrin molecule would be more reactive to a reactive isocyanate group than would be the secondary hydroxyl groups at the 2- and/or 3-position of the cyclodextrin molecule.

It will be recognized by those in the art that a very large number of possible isomers of modified cyclodextrins are possible, and that a very large number of possible isomers for the crosslinked modified or unmodified cyclodextrin are possible. Since there are 6, 7 or 8 glucopyranose rings in the usual $\alpha$-, $\beta$-, and $\gamma$-cyclodextrin molecules (respectively) and each glucopyranose ring includes three hydroxyl groups, any one or more of which may be modified and/or reacted with the reactive isocyanate group, a huge number of isomers are possible. As will be recognized, if more than one modifying group is used on the cyclodextrin, the numbers go much higher.

In one embodiment, the crosslinking reaction between the modified cyclodextrin and the water and the polyurethane prepolymer may be carried out as follows. The modified cyclodextrin is dissolved in water at a concentration ranging from 0.1 wt % to saturation, depending on the objective. The solution of modified cyclodextrin is mixed with a polyurethane prepolymer at a temperature ranging from about 10° C. to about 120° C., as described herein. The mixed solution is coated onto a substrate such as a release liner or a polymeric backing and is crosslinked. The ratio of modified cyclodextrin to water to polyurethane prepolymer is selected to obtain the desired foam.

In another embodiment, either the solution of modified cyclodextrin (with or without additional ingredients in the solution) or the polyurethane prepolymer may be applied to the substrate first, followed by the other of the modified cyclodextrin or polyurethane prepolymer, and thereafter the two components are allowed to react to form the cross-linked foam composition. In this embodiment, the individual components may be applied independently by any suitable means, including spraying, roll coating, knife coating, doctor blade coating, etc. In one such embodiment, both components are applied by spraying onto the substrate.

In one embodiment, the ratio of modified cyclodextrin to polyurethane prepolymer may range from about 1:10 to about 10:1. In one embodiment, the ratio of modified cyclodextrin to polyurethane prepolymer may range from about 1:5 to about 5:1. In one embodiment, the ratio of modified cyclodextrin to polyurethane prepolymer may range from about 1:3 to about 3:1. In one embodiment, the ratio of modified cyclodextrin to polyurethane prepolymer is about 1:2. That is, when the ratio of modified cyclodextrin to polyurethane prepolymer is about 1:2, on average, each molecule of modified cyclodextrin can potentially react with two molecules of polyurethane prepolymer in the crosslinking reaction. In one such embodiment, the two molecules of polyurethane prepolymer in the crosslinking reaction are two different molecules of polyurethane prepolymer. Of course, with cyclodextrins containing from six to eight glucopyranose rings, each having as many as three hydroxyl groups available for reaction, any one molecule of modified cyclodextrin may be cross-linked to many more than two polyurethane prepolymer molecules. In addition, in an embodiment in which the modifying group of the modified cyclodextrin includes a plurality of hydroxyl or other isocyanate-reactive groups, the potential number of crosslinking sites becomes even greater.

In one embodiment, the process of the present invention further includes providing a polyol, e.g., an alkylene glycol, a polyalkylene glycol, glycerol or a combination of any two or more thereof and combining the alkylene glycol, the polyalkylene glycol, the glycerol or the combination of any two or more thereof with the modified cyclodextrin and the polyurethane prepolymer in the combining step or, in an alternative embodiment, premixing the alkylene glycol, the polyalkylene glycol, the glycerol or the combination of any two or more thereof with the modified cyclodextrin prior to the combining step. That is, in one embodiment, the foregoing materials may be added to the reaction mixture and will become part of the foam composition, including in at least some embodiments, in which the alkylene glycol, polyalkylene glycol and/or glycerin is crosslinked with or bonded to other components of the foam, including the modified cyclodextrin and any free cyclodextrin which may also be present, by the polyurethane prepolymer. In one embodiment, addition of the alkylene glycol, the polyalkylene glycol, the glycerol or the combination of any two or more thereof with the modified cyclodextrin results in the formation of a foam having improved flexibility, when the mixture is cross-linked by the polyurethane prepolymer. In such embodiments, the relative quantities of the ingredients can be adjusted to control the features of the produced foam. For example, if a more rigid foam is desired, then less or none of the additional polyol would be added, and/or a polyurethane prepolymer having less flexibility or smaller size (i.e., molecular weight) would be used. If a less rigid foam is desired, then more of the additional polyol and/or a more flexible or higher molecular weight polyurethane prepolymer would be used. If a foam having larger cells is desired, then a higher temperature may be employed or, alternatively, an external foaming agent may be added to the reaction mixture. The amount of water added to the reaction mixture may also have an effect on the quality of the foam, and in one embodiment, is selected to avoid formation of a hydrogel.

In one embodiment, the polyol includes polyalkylene polyols or polyols comprising ethylene-oxide-derived monomeric units. In one embodiment, the polyol is water soluble. in one embodiment, the polyol has a weight average molecular weight in the range from about 200 to about 30,000. As noted above, in one embodiment, the weight average molecular weight of the polyurethane prepolymer may range from about 500 to about 30,000 or higher, and in another, from about 500 to about 10,000.

In one embodiment, the process of the present invention further includes combining an unmodified cyclodextrin with the modified cyclodextrin and the polyurethane prepolymer in the combining or premixing the unmodified cyclodextrin with the modified cyclodextrin prior to the step of combining. Thus, in this embodiment, the foam will further include unmodified cyclodextrin as part of the foam. In one embodiment, the unmodified cyclodextrin is crosslinked with the polyurethane prepolymer.

In one embodiment, the foam further comprises non-crosslinked modified and/or non-crosslinked unmodified cyclodextrin. In this embodiment, some of the cyclodextrin, whether modified or unmodified, is either present as free cyclodextrin (modified or not modified) or present as modified or unmodified cyclodextrin which is singly-bonded to the polyurethane prepolymer. Thus, the modified or unmodified cyclodextrin that is singly bonded is chemically attached to the foam, while any modified or unmodified cyclodextrin that is not bonded may form a part of the foam, but is not chemically bonded and is thus subject to dissolution in water absorbed by the foam.

Thus, in one embodiment, the foam further comprises non-crosslinked modified cyclodextrin, free modified and/or unmodified cyclodextrin, modified and/or unmodified cyclodextrin singly bonded to the polyurethane prepolymer or a mixture of any two or more thereof.

In one embodiment, at least a portion of the cyclodextrin is complexed. The cyclodextrin may be provided in a complexed form, or a compound or material to be complexed may be added to the crosslinking reaction mixture (if it is not subject to reaction with the polyurethane prepolymer) or may be added to the foam formed by the crosslinking reaction subsequent to completion of the crosslinking reaction.

EXAMPLES

Selected embodiments of the foam composition in accordance with the present invention are presented. These examples are provided to illustrate the invention and are not intended to limit the scope of the invention which is limited only by the scope of the claims appended hereto.

Preparation of Solution A

Into 504 g of demineralized water, a 64 g (12.70 wt %) sample of α-cyclodextrin is dissolved. This is Solution A as used in the following Examples 1-11 shown in Table 1.

Preparation of Solution B

Into 151.55 g of demineralized water, a 16.58 g (10.94 wt %) sample of hydroxypropyl-β-cyclodextrin is dissolved. This is Solution B as used in the following Examples 1-11 shown in Table 1.

Polyurethane Prepolymer

In the following Examples 1-11, the polyurethane prepolymer used is HYPOL® 2002, which is a TDI-based partially polymerized polyurethane prepolymer, from DOW Chemical Co.

Examples 1-11

In the following Examples 1-11, the above prepared Solution A or Solution B or none and the polyurethane prepolymer are used in the indicated amounts. The prepolymer is weighed into a beaker, and the indicated amounts of water or cyclodextrin is added. The resulting mixture is stirred at 23° C.

until a homogeneous white color appears. The resulting mixture is then poured onto plates and placed in an oven at 50° C. to accelerate the reaction. A range of water amounts is evaluated to determine foam properties. All measurements are made at room temperature.

As shown in Table 1, foam compositions in accordance with various embodiments of the present invention provide quite high swellability, high weight gain ability, and high odor-absorbing activity, while maintaining the foam structure. In all of the Examples 1-11, an open cell foam is formed.

In the examples shown in Table 1, the fluid capacities are measured as follows. For the initial fluid capacity, the dry foam sample is weighed ("Initial wt." in Table 1) and is then immersed in water for 30 minutes, taken out and weighed ("30 min. wt."), and the percent weight increase ("30 min. %") is determined by the formula (wet weight−dry weight)/dry weight.

The same procedure is used for the 18 hour samples, except that the foam samples are soaked in water for 18 hours, then weighed ("18 hr. saturate wt."). The same samples are then drained by draining for 30 seconds the water that is not absorbed into the foam or bound to the foam, and the samples are then weighed again ("18 hr. drain wt."). The same calculation as above is performed to determine the percent weight increase ("18 hr. saturate %" and "18 hr. drain %", respectively).

The odor absorption test is carried out as follows. A 1 g. sample of the foam is maintained in the presence of 2 ml of a solution containing 1200 ppm of the valeric or butyric acid, for 8 hours at a temperature of 31° C. The resultant foam sample is graded against the odor of a foam sample that has not been exposed to the respective acids, on the following scale:

Grade 1 same smell as the control;
Grade 2 a slight odor of the acid;
Grade 3 a strong odor, but less strong that the 1200 ppm standard;
Grade 4 an odor of the same strength as the 1200 ppm standard.

As shown by the results in the Table 1, the cyclodextrin containing foam compositions, in accordance with the present invention, show a much higher absorption of the acid odors.

providing a cyclodextrin;
providing a polyurethane prepolymer;
providing water; and
combining the cyclodextrin, the water and the polyurethane prepolymer; and
reacting the polyurethane prepolymer with the water and the cyclodextrin to form a foam composition comprising the cyclodextrin crosslinked with the polyurethane prepolymer and having a foam structure; and
applying the cyclodextrin, the water and the polyurethane prepolymer to a substrate.

In one embodiment, the step of combining is followed by the step of reacting the polyurethane prepolymer with the water and crosslinking the cyclodextrin, which is in turn followed by applying the reacted cyclodextrin and polyurethane prepolymer to the substrate. In one embodiment, the step of combining is followed by the step of applying the combined cyclodextrin, water and polyurethane prepolymer to the substrate, which is followed by reacting the polyurethane prepolymer with the water and crosslinking the cyclodextrin. Thus, the crosslinking reaction in the allowing step may take place before, during or after the applying step. In one embodiment, the crosslinking reaction in the reacting step begins as soon as the cyclodextrin and water and polyurethane prepolymer are combined and continues during and subsequent to the step of applying the combined cyclodextrin and polyurethane prepolymer to the substrate.

In one embodiment, the substrate comprises a backing layer or a release liner on at least a portion of which the foam forms a layer. The backing layer and the release liner may be formed of any suitable material, depending primarily upon what type of personal care product is to be formed.

In one embodiment of the personal care foam product, the foam is in the form of a patch, in which the foam is either adhered or not adhered to a backing layer. The foam composition may also have a release liner on the side thereof away from the backing layer, particularly when the foam composition is adhesive in nature. The backing layer may further comprise a pressure sensitive adhesive layer to enhance adhesion to the user's anatomy or to other parts of the personal care product.

TABLE 1

| Ex. No. | PUP[1] Hypol ® (g.) | CD Water/CD[1] (g.) | Water Absorption Initial wt. | Water Absorption 30 min. wt. | Water Absorption 30 min. % | Water Absorption 18 hr. saturate wt. | Water Absorption 18 hr. saturate % | Water Absorption 18 hr. drain wt. | Water Absorption 18 hr. drain % | Odor absorption Valeric acid | Odor absorption Butyric acid |
|---|---|---|---|---|---|---|---|---|---|---|---|
| 1 | 29.17 | 3.2 water | 1.2 | 4.25 | 254 | 9.62 | 702 | 8.63 | 619 | 4 | 3 |
| 2 | 36.5 | 36.5 water | 0.83 | 8.05 | 870 | 8.17 | 884 | 7.13 | 759 | 4 | 3 |
| 3 | 30.89 | 102.96 water | 1.03 | 6.34 | 516 | 6.51 | 532 | 5.57 | 441 | 4 | 3 |
| 9 | 41.1 | 4.56 A | 0.92 | 16.33 | 1675 | 17.62 | 1815 | 16.4 | 1683 | 2 | 2 |
| 7 | 27.62 | 27.62 A | 1.18 | 10.06 | 753 | 9.67 | 719 | 7.89 | 569 | 2 | 1 |
| 8 | 37.0 | t23.0 A | 1.81 | 7.03 | 288 | 7.39 | 308 | 6.9 | 28t | 1 | 1 |
| 10 | 35.29 29.99 | 3.92 B 7.5 B | 1.37 | 15.08 | 1001 | 19.37 | 1314 | 15.79 | 1053 | 2 | 2 |
| 11 | 32.48 27.1 | 32.48 B 90 B | 1.17 | 10.57 | 803 | 11.04 | 844 | 8.51 | 627 | 1 | 2 |

[1]PUP is the polyurethane prepolymer, HYPOL ®2002; CD is the Solution A or Solution B.
[2]Water is used for control samples; Solution A or Solution B are added as indicated by "A" and "B".

Personal Care Products

In one embodiment, the present invention further relates to a process for preparing a foam-containing personal care product, comprising:

The term "backing layer" refers to that component of an article such as a personal care product, for example, an infant diaper, sanitary napkin, adult incontinence garment or the like which is worn during normal use furthest from the user's body and which may serve to minimize or prevent the exudation leakage of the absorbed liquid, or to protect the underlying elements of the user's skin.

The backing layer can be any material convenient to the particular application. The backing layer can be made of any suitable natural or synthetic fiber or fabric, and can be woven or non-woven. Various materials can be used as the backing material. Specific examples include papers, non-woven fabrics, natural fiber (e.g., cotton) fabrics, synthetic resin fabrics, synthetic resin films, synthetic resin foams, mesh-form or network papers, woven fabrics, and knit fabrics. Surgical tapes, medical pressure-sensitive adhesive sheets, pressure-sensitive adhesive dressings, constructed with the above films, foams, non-woven fabrics, woven fabrics, or knits can also be used as a backing material. The backing layer can also be in the form of an impermeable or permeable foam made from natural materials or from synthetic materials such as polyolefin, polyester, polyurethane, and the like.

Examples of suitable backing materials include polyurethanes such as ESTANE® polyurethanes (B.F. Goodrich, Cleveland, Ohio) including, for example, ESTANE® 58237, ESTANE® 58245, and ESTANE® 58309. Other suitable backing materials include elastomeric polyester such as HYTREL® polyester elastomer (E.I. du Pont de Nemours & Co., Wilmington, Del.), blends of polyurethane and polyester, and polyvinyl chloride. Thermoplastic polyether-amide block copolymers such as PEBAX® 2533 and PEBAX® 3533 (available from Atochem Co.); and polyether-ester block copolymers may also be used.

In one embodiment, the backing layer has a thickness of from about 15 to about 100 micrometers or more, in one embodiment from about 20 to about 80 micrometers and in another embodiment, from about 20 to about 50 micrometers.

In one embodiment, the backing layer is a transparent, conformable, moisture vapor permeable film. In one embodiment, the backing layer is also elastomeric. In one embodiment, the backing film is impermeable to liquid water and has a moisture vapor transmission rate (MVTR) of at least 300 g per 24 hr at 37° C. and 80% relative humidity.

In an embodiment in which the backing extends beyond the area of the foam composition, the backing may include an adhesive that may also serve as a skin contact adhesive around the border of the backing layer.

In one embodiment, the personal care product may include a liquid permeable skin or wound contacting layer and an outer, liquid-impervious backing layer, in which the foam is between these two layers.

In one embodiment, the backing layer may extend beyond at least one edge of the foam to provide an adhesive coated margin adjacent to the foam for adhering the product to a surface, such as to the skin of a patient adjacent to the wound being treated. In one embodiment, an adhesive coated margin may extend around all sides of the product. In another embodiment, there is no adhesive-coated margin. In another embodiment, the foam is non-adherent to prevent the product from sticking to a surface or the skin of a patient adjacent to the wound being treated.

The release liner can be any suitable material known to the art or to the literature and generally is a plastic which, in one embodiment, the release liner can be a plastic such as a polyolefin, for example polyethylene or polypropylene, or it can be polyvinylchloride, nylon, and the like. In one embodiment, it can contain a release liner thereon such as a thin layer of silicone. In such an embodiment, the product can be applied to a substrate such as human skin simply by removing the release liner and applying thereto the odor-absorbing foam containing the backing.

In one embodiment, the personal care product comprises one or more of a bandage, a wound dressing, a wipe, a diaper, a diaper pant, a training pant, an absorbent underpant, a protective swimming undergarment, an incontinence garment, a panty shield or liner, a feminine hygiene product or a perspiration shield. Other personal care products known in the art may also be included within the scope of the present invention. In one embodiment, the personal care product may be any such product that can benefit from the presence of a odor-absorbing foam somewhere in its structure.

In one embodiment, the odor-absorbing foam used in the personal care product further includes a quantity of unmodified cyclodextrin crosslinked with the polyurethane prepolymer and water or simply as a component of the odor-absorbing foam without being crosslinked. The unmodified cyclodextrin may be unbonded or may be singly bonded to the odor-absorbing foam structure.

In one embodiment, at least a portion of the unmodified cyclodextrin is complexed. That is, in one embodiment, at least a portion of the unmodified cyclodextrin includes another material, such as a pharmaceutical, a perfume or some other material in or partially the cavity of the cyclodextrin molecule.

In one embodiment, at least a portion of the modified cyclodextrin is complexed. That is, in one embodiment, at least a portion of the modified cyclodextrin includes another material, such as a pharmaceutical, a perfume or some other material in or partially the cavity of the cyclodextrin molecule.

In one embodiment, the personal care product may be made by any of the various process alternatives described herein.

In one embodiment, the present invention relates to a personal care product including an odor-absorbing foam, including a modified cyclodextrin crosslinked with a polyurethane prepolymer, in which the odor-absorbing foam is applied to a substrate, wherein a ratio of the modified cyclodextrin to the water and the polyurethane prepolymer is selected to result in formation of the odor-absorbing foam.

While the invention has been explained in relation to various of its embodiments, it is to be understood that various modifications thereof will become apparent to those skilled in the art upon reading the specification. Therefore, it is to be understood that the invention disclosed herein is intended to cover modifications as fall within the scope of the claims.

What is claimed is:

1. A foam composition comprising a cyclodextrin crosslinked with a polyurethane prepolymer and having a foam structure, the cyclodextrin crosslinked by a polyurethane prepolymer comprising a reaction product of a reactive isocyanate moiety reacted with at least one isocyanate-reactive group on at least a portion of the cyclodextrin, wherein the isocyanate-reactive group is an active hydrogen on a modifying group attached to the at least a portion of the cyclodextrin;
   wherein the content of the cyclodextrin in the composition is from 0.5 wt % to 50 wt %;
   wherein the foam has an original volume and upon absorption of water is capable of swelling to a volume at least about 20% greater than its original volume; and
   wherein the content of the water in the composition is in the range from 10 wt. % to 80 wt. %, based on the composition, prior to the crosslinking, foaming and drying steps.

2. The foam composition of claim 1 wherein the cyclodextrin is an .alpha.-cyclodextrin, a .beta.-cyclodextrin, a .gamma.-cyclodextrin or a mixture of any two or more thereof.

3. The foam composition of claim 1 wherein the at least one isocyanate-reactive group comprises a hydroxyalkyl group, an aminoalkyl group, a carboxyl group, a sulfhydryl group, an epoxy group, or a combination of any two or more thereof.

4. The foam composition of claim 1 wherein the reactive isocyanate moiety comprises an aliphatic, cycloaliphatic, arylaliphatic, heterocyclic or aromatic polyisocyanate or a mixture thereof.

5. The foam composition of claim 1 wherein the polyurethane prepolymer has an average isocyanate functionality of about 2 or greater.

6. The foam composition of claim 1 wherein a ratio of water to the cyclodextrin and the polyurethane prepolymer is selected to result in formation of the foam.

7. The foam composition of claim 6 wherein the ratio is controlled to avoid formation of a hydrogel.

8. The foam composition of claim 1 wherein the at least one isocyanate-reactive group further includes one or more of a primary hydroxyl group of the cyclodextrin, a secondary hydroxyl group of the cyclodextrin, or a combination of any two or more of the recited isocyanate-reactive groups.

9. The foam composition of claim 1 further comprising an alkylene glycol, a polyalkylene glycol, glycerol or a combination of any two or more thereof.

10. The foam composition of claim 9 wherein a portion of the alkylene glycol, the polyalkylene glycol, the glycerol or the combination of any two or more thereof is chemically bonded to the polyurethane prepolymer.

11. The foam composition of claim 1 further comprising non-crosslinked cyclodextrin.

12. The foam composition of claim 11 wherein the non-crosslinked cyclodextrin comprises free modified and/or unmodified cyclodextrin, modified and/or unmodified cyclodextrin singly bonded to the polyurethane prepolymer or a mixture of any two or more thereof.

13. The foam composition of claim 1 wherein at least a portion of the cyclodextrin is complexed.

14. The foam composition of claim 1 wherein the foam has an original weight and upon absorption of water is capable of increasing its weight to a weight at least about 20% greater than its original weight.

15. A personal care product comprising the foam composition of claim 1.

16. The composition of claim 1, wherein the cyclodextrin in the composition is in the range from 3 wt % to 20 wt %.

17. The composition of claim 1, wherein the content of the water in the composition is in the range from 30 wt. % to 50 wt. %, based on the composition, prior to the crosslinking, foaming and drying steps.

* * * * *